(12) United States Patent
Beyfuss et al.

(10) Patent No.: US 8,155,360 B2
(45) Date of Patent: Apr. 10, 2012

(54) HEARING APPARATUS WITH A LINEAR SWITCH

(75) Inventors: Stefanie Beyfuss, Erlangen (DE); Werner Fickweiler, Bubenreuth (DE); Holger Kral, Fürth (DE)

(73) Assignee: Siemens Medical Instruments Pte. Ltd., Singapore (SG)

( * ) Notice: Subject to any disclaimer, the term of this patent is extended or adjusted under 35 U.S.C. 154(b) by 903 days.

(21) Appl. No.: 12/176,754

(22) Filed: Jul. 21, 2008

(65) Prior Publication Data

US 2009/0022347 A1    Jan. 22, 2009

(30) Foreign Application Priority Data

Jul. 20, 2007  (DE) .......................... 10 2007 033 876

(51) Int. Cl.
*H04R 25/00*  (2006.01)
(52) U.S. Cl. .......................... 381/322; 381/323; 381/324
(58) Field of Classification Search ........... 381/322–324
See application file for complete search history.

(56) References Cited

U.S. PATENT DOCUMENTS

| | | | |
|---|---|---|---|
| 3,138,491 A | * | 6/1964 | Komatsu et al. ................ 429/97 |
| 3,475,566 A | | 10/1969 | Bauer |
| 3,701,862 A | * | 10/1972 | Vignini ........................... 429/97 |
| 4,230,777 A | | 10/1980 | Gatto |
| 4,434,635 A | * | 3/1984 | Borgato ........................ 70/279.1 |
| 4,941,180 A | | 7/1990 | Buettner |
| 5,251,105 A | | 10/1993 | Kobayashi et al. |
| 5,687,242 A | | 11/1997 | Iburg |

FOREIGN PATENT DOCUMENTS

| | | |
|---|---|---|
| DE | 1242736 B | 6/1967 |
| DE | 4120968 A1 | 1/1992 |
| DE | 4331382 C1 | 11/1994 |

OTHER PUBLICATIONS

German Office Action dated Mar. 27, 2008.
European Search Report dated Nov. 30, 2010.

* cited by examiner

*Primary Examiner* — Steven Loke
*Assistant Examiner* — Kimberly M Thomas
(74) *Attorney, Agent, or Firm* — Laurence A. Greenberg; Werner H. Stemer; Ralph E. Locher

(57) ABSTRACT

A hearing apparatus allowing a user to reliably switch the apparatus on and/or off includes a battery compartment for a battery and an actuation element disposed at the battery compartment for switching the apparatus on and/or off. A contact element has a contact point and taps an electric potential on the battery with the contact point when the actuation element is in a first position. The actuation element, in a second position linearly displaced from the first position, lifts the contact element at a lifting section of the contact element being different from the contact point, to remove the contact point of the contact element from the battery. Thus, the contact point of the contact element only contacts the battery and no additional material, preventing materials from being scratched and an electric circuit from being interrupted and ensures that an even, grippable surface of the actuation element is always available.

5 Claims, 7 Drawing Sheets

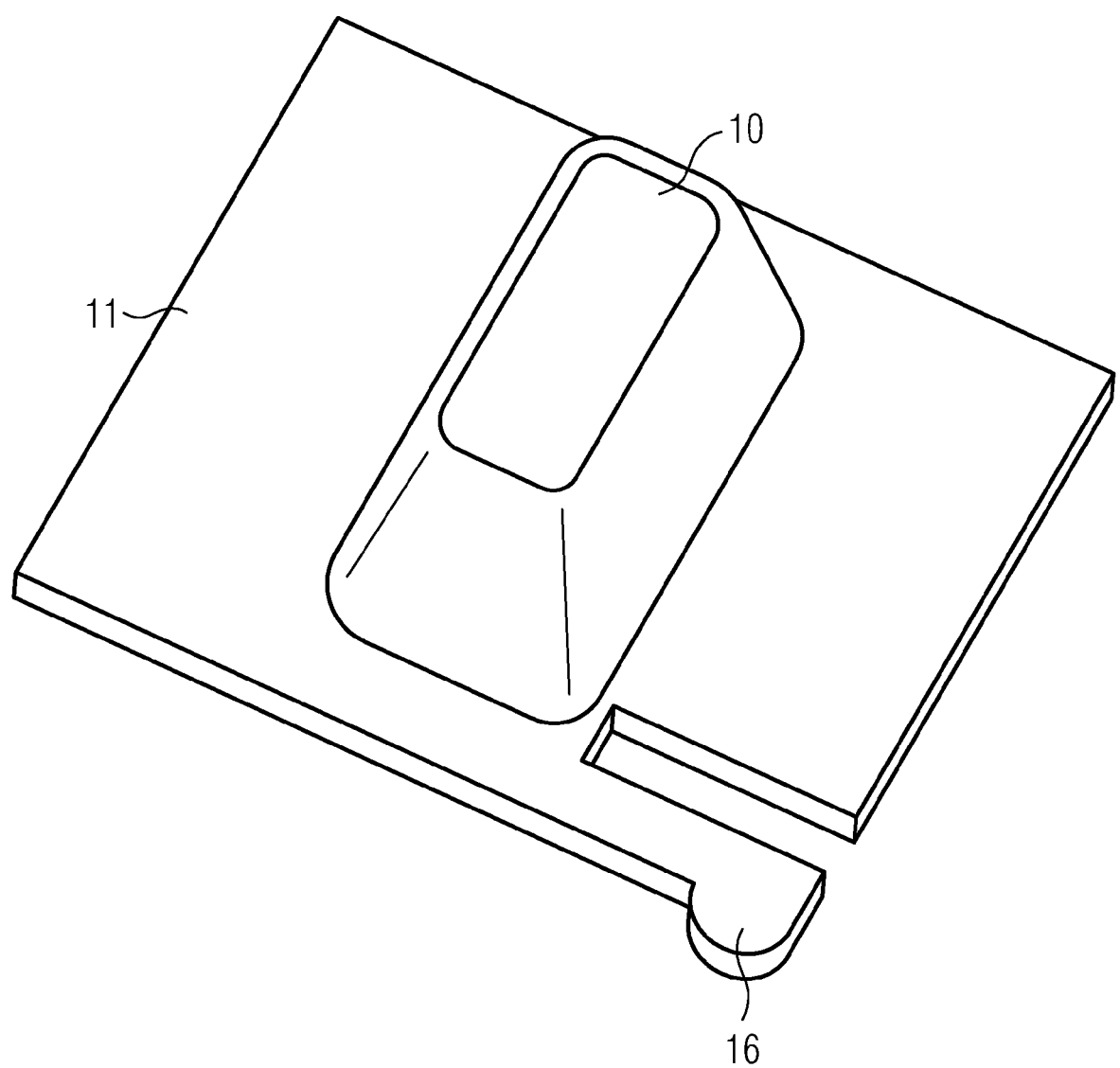

HEARING APPARATUS WITH A LINEAR SWITCH

CROSS-REFERENCE TO RELATED APPLICATION

This application claims the priority, under 35 U.S.C. §119, of German Patent Application DE 10 2007 033 876.9, filed Jul. 20, 2007; the prior application is herewith incorporated by reference in its entirety.

BACKGROUND OF THE INVENTION

Field of the Invention

The present invention relates to a hearing apparatus with a battery compartment for accommodating a battery, an actuation element disposed on the battery compartment for switching the hearing apparatus on and/or off, and a contact element which has a contact point and which taps an electrical potential on the battery by way of the contact point in a first position of the actuation element. The term hearing apparatus is understood in this case to mean a hearing device. The term also includes other wearable and non-wearable acoustic devices such as headsets, earphones and the like.

Hearing devices are wearable hearing apparatuses which are used to assist the hearing impaired. In order to accommodate numerous individual requirements, various types of hearing devices are available such as behind-the-ear (BTE) hearing devices and in-the-ear (ITE) hearing devices, for example concha hearing devices or completely-in-the-canal (ITE, CIC) hearing devices as well. The hearing devices listed as examples are worn on the outer ear or in the auditory canal. Bone conduction hearing aids, implantable or vibrotactile hearing aids are also available on the market. Damaged hearing is thus stimulated either mechanically or electrically.

The key components of hearing devices are principally an input converter, an amplifier and an output converter. The input converter is normally a receiving transducer e.g. a microphone and/or an electromagnetic receiver, e.g. an induction coil. The output converter is most frequently realized as an electroacoustic converter e.g. a miniature loudspeaker, or as an electromechanical converter e.g. a bone conduction hearing aid. The amplifier is usually integrated into a signal processing unit. Such a basic configuration is illustrated in FIG. 1 using the example of a behind-the-ear hearing device. One or a plurality of microphones 2 for recording ambient sound are built into a hearing device housing 1 to be worn behind the ear. A signal processing unit 3, which is also integrated into the hearing device housing 1, processes and amplifies the microphone signals. An output signal for the signal processing unit 3 is transmitted to a loudspeaker or receiver 4, which outputs an acoustic signal. Sound is transmitted to the device wearer's eardrum through a sound tube, which is affixed in the auditory canal by an otoplastic. Power for the hearing device and, in particular, for the signal processing unit 3, is supplied through the use of a battery 5 which is also integrated in the hearing device housing 1.

Hearing devices usually have a switch and can thus be switched on and/or off at any time. U.S. Pat. No. 3,475,566 discloses a hearing device with a battery compartment and a switch. In that case, it is important for the switch to be embodied as a rotating ring, which has an actuation element, through the use of which the rotating ring can rotate in order to switch the hearing device on and/or off. The battery is removed from a contact element and the electric circuit is interrupted by rotating the rotating ring. That is problematic in that when rotating the rotating ring, the actuation element protrudes less out of the housing, particularly in end positions, so that a grippable surface of the actuation element becomes smaller. That frequently presents a significant problem specifically for older and very young hearing device wearers and renders use of the hearing device inconvenient since the actuation element can only be gripped with difficulty precisely at the points which indicate the on/off state of the hearing device.

Furthermore, U.S. Pat. No. 4,230,777 discloses a switch for a communication device, having a rotary knob which is constructed to accommodate a battery. In that case the rotary knob represents a housing for the battery, so that by rotating the rotary knob, the battery is also rotated. The switch also includes two contact elements which rest on a cover of the rotary knob. The cover of the rotary knob also has two openings into which the contact elements protrude once the rotary knob is rotated accordingly. An electric circuit is closed in that way and the device is switched on. It is disadvantageous that the two contact elements continuously contact the cover of the rotary knob which, by rotating the rotary knob, may result in the cover material abrading and thus an abraded swarf interrupting the electric circuit. In addition, there is still the problem that not all of the grippable surface of the rotary knob can be reached.

SUMMARY OF THE INVENTION

It is accordingly an object of the invention to provide a hearing apparatus with a linear switch, which overcomes the hereinafore-mentioned disadvantages of the heretofore-known devices of this general type and which allows the hearing apparatus to be switched on and off reliably.

With the foregoing and other objects in view there is provided, in accordance with the invention, a hearing apparatus, comprising a battery compartment for accommodating a battery, a contact element having a contact point and a lifting section different from the contact point, and an actuation element disposed at the battery compartment and movable between first and second positions displaced linearly relative to each other for switching the hearing apparatus on and/or off. The actuation element, in the first position, causes the contact element to tap an electric potential on the battery with the contact point. The actuation element, in the second position, lifts the contact element at the lifting section to lift the contact point from the battery.

A structure is thus advantageously achieved in which the contact point of the contact element only contacts the battery and not any additional materials, because the contact element is not lifted directly at the contact point. As a result, the contact point of the contact element remains uncontacted by the actuation element, thereby increasing the reliability of the electrical contact with the battery. Furthermore, the linear movement of the actuation element ensures that the grippable surface of the actuation element always remains the same, so that the actuation element can be gripped by a user in a convenient fashion. The fact that only the contact element needs to be moved to switch the hearing apparatus on and/or off means that the battery does not need to be moved, thereby resulting in a particularly reliable closing and/or opening of the electric circuit. An additional advantage resides in the battery compartment itself being freed of complicated mechanisms, which have an effect on the robustness of the hearing apparatus.

In accordance with another feature of the invention, the lifting section of the contact element preferably has a contact surface, at which the actuation element lifts the contact element and the contact surface is embodied in such a way that a movement of the actuation element from the first to the second position effects a movement of the contact element which is substantially at right angles thereto. The contact element can thus be lifted particularly reliably and removed from the battery. The contact surface allows the actuation element to be lifted directly on the contact surface solely through the use of a linear movement.

In accordance with a further feature of the invention, optionally, when in the second position, the actuation element can lift the contact element from the battery using a lifting arm, which is embodied in such a way that a movement of the actuation element from the first to the second position effects a movement of the contact element which is substantially parallel thereto. The contact element can thus advantageously be disposed at a greater distance from the actuation element, thereby producing a certain freedom when placing a fastening element on the hearing apparatus.

In accordance with a concomitant feature of the invention, the actuation element preferably has a detent nose which, in at least one position of the actuation element, protrudes into a recess of a housing or a frame of the hearing apparatus in order to stabilize the actuation element. The detent nose achieves a robust structure and also ensures that when the actuation element is displaced, the detent nose protruding into an opening indicates a predetermined state of the hearing apparatus. Provision can naturally also be made for the actuation element to have a recess and the housing or the frame to have a corresponding detent nose.

Other features which are considered as characteristic for the invention are set forth in the appended claims.

Although the invention is illustrated and described herein as embodied in a hearing apparatus with a linear switch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 7 is a perspective view of the actuation element with a detent nose.

DETAILED DESCRIPTION OF THE INVENTION

Figure 1:
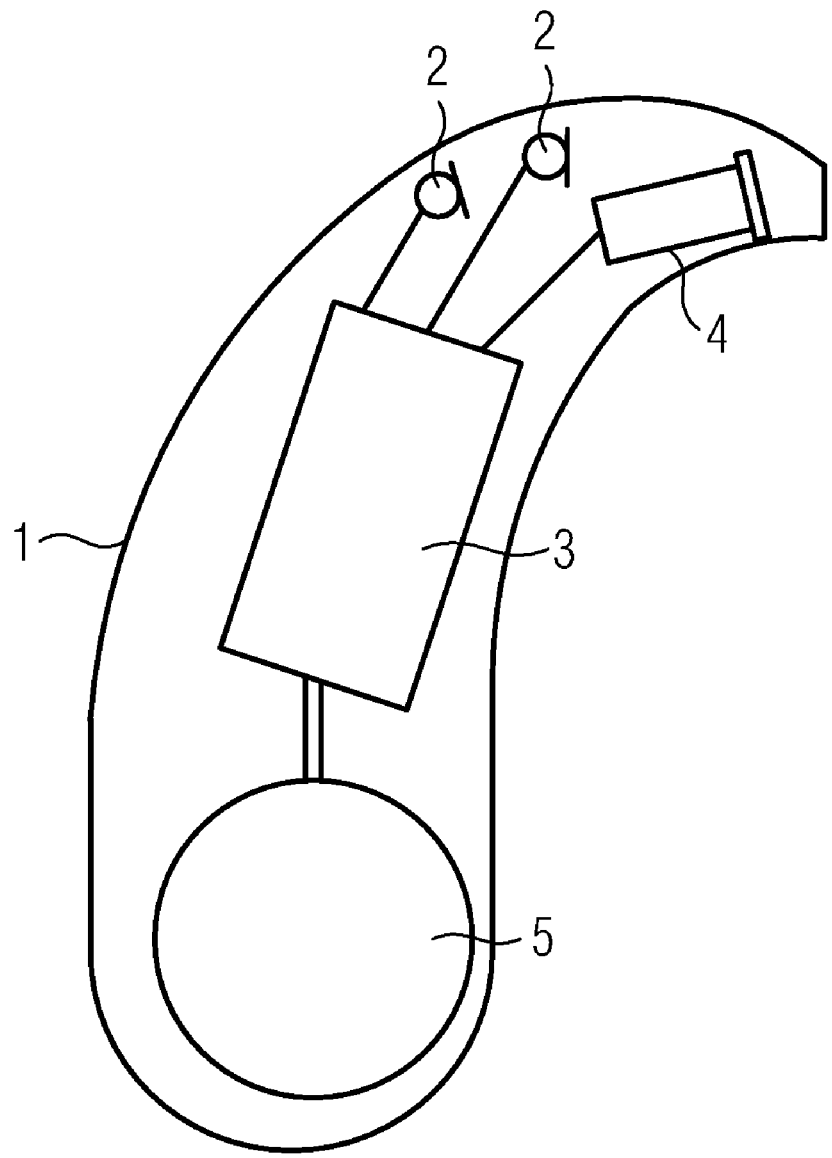
FIG. 1 is a diagrammatic, side-elevational view of an interior of a housing of a behind-the-ear hearing device according to the prior art.
Figure 2:
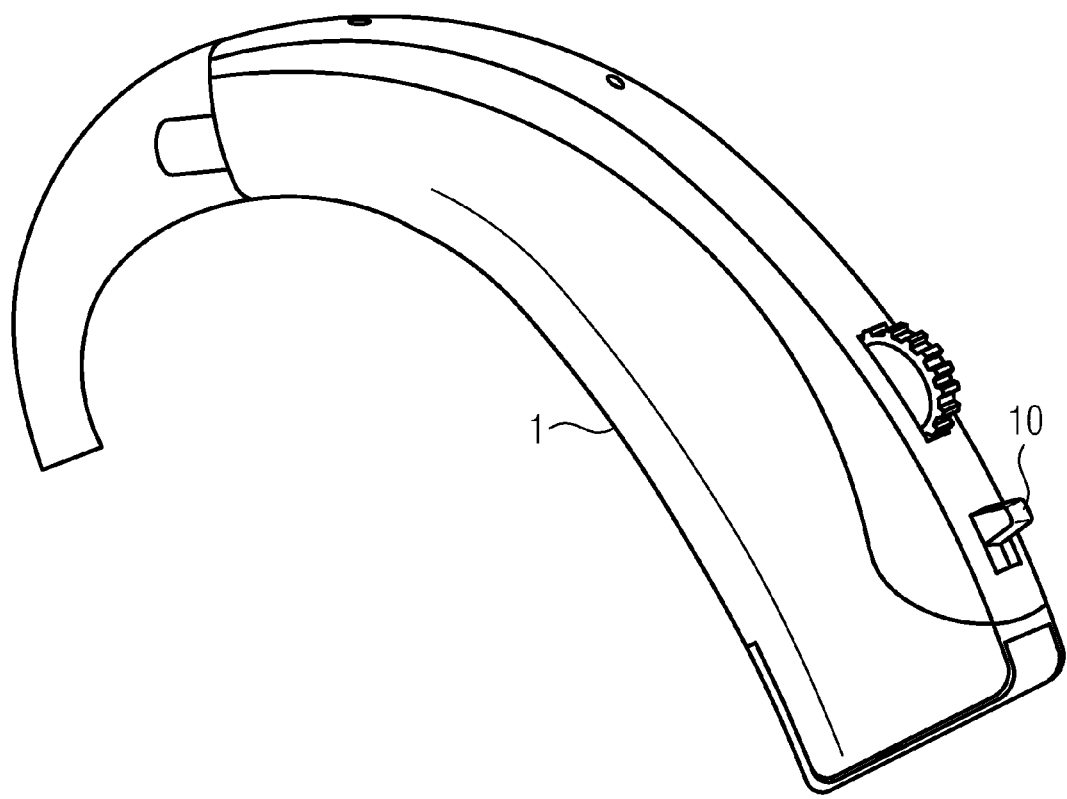
FIG. 2 is a perspective view of a behind-the-ear hearing device according to the invention with an actuation element for switching the hearing device on and/or off.

Referring now to the figures of the drawings in detail and first, particularly, to FIG. 2 thereof, there is seen a behind-the-ear hearing device in which provision is made for an actuation element 10 protruding from a housing 1, for switching the hearing device on and/or off.

Figure 3:
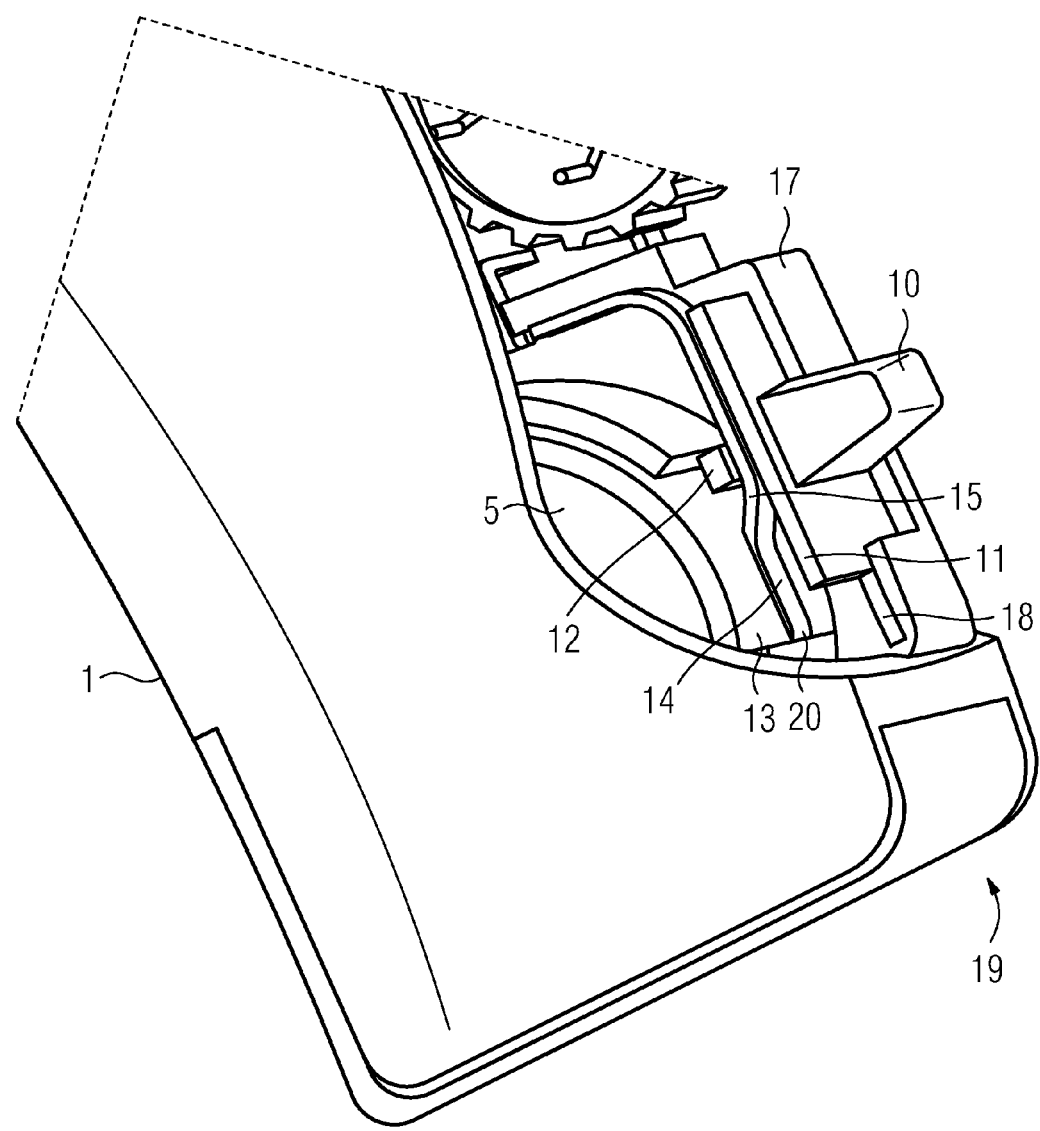
FIG. 3 is an enlarged, fragmentary, perspective view of a battery compartment with the actuation element in a first position.

As is shown in FIG. 3, the actuation element 10 is disposed on a battery compartment 19 of the hearing device. The actuation element 10 has a sliding plate 11, which is accommodated in a section 18 of a frame 17. The actuation element 10 can thus be moved along the section 18. Furthermore, the actuation element 10 includes a square lifting element 12, which is disposed on the sliding plate 11 and more particularly on a side of the sliding plate 11 disposed opposite the actuation element 10. It is important in this case that the actuation element 10 protrudes from the frame 17 and thus from the housing 1 of the hearing device and that the linear displacement of the actuation element 10 along the section 18 does not influence the grippable surface of the actuation element 10.

As is likewise shown in FIG. 3, a battery 5 is disposed in the battery compartment 19. In a first position of the actuation element 10 shown in FIG. 3, a contact element 14 rests against a tapping surface 13 of the battery 5, so that the contact element 14 taps an electric potential there. An electric circuit is thus closed and the hearing device is switched on. In this case the contact element 14 contacts the battery 5 only by way of a contact point 20, which is disposed at one end of the contact element 14. Furthermore, the contact element 14 has a contact surface 15, on which the contact element can be lifted and removed from the battery. The contact point 20 is clearly distanced from the contact surface 15.

Figure 4:
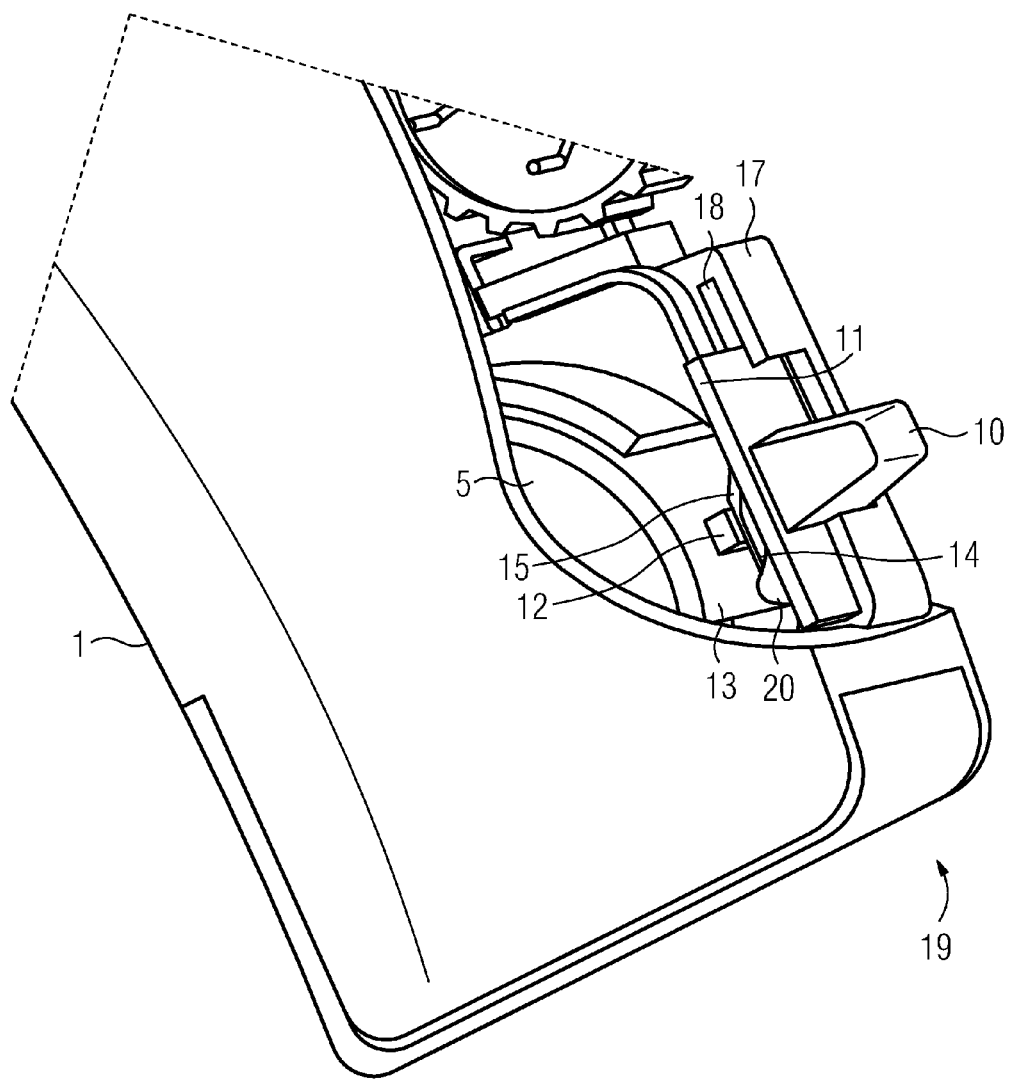
FIG. 4 is a fragmentary, perspective view of the battery compartment with the actuation element in a second position.

In a second position of the actuation element 10 shown in FIG. 4, which is achieved by a linear displacement of the actuation element 10, the lifting element 12 lifts the contact element 14 at the lifting section 15. It is apparent that the linear displacement of the actuation element 10 along the section 18 effects a movement of the contact element 14 substantially at right angles to the section 18, which is attributed to the contact surface 15 of the contact element 14. If the contact element 14 is not lifted directly by the lifting element 12 but instead through the use of a lifting arm, which can be disposed substantially parallel to the sliding plate 11, and if the contact element is disposed at right angles to the section 18 for instance, the linear displacement of the actuation element 10 along the section 18 can possibly result in a movement of the contact element which is likewise parallel with respect to the section 18. Thus, the components of the actuation element 10 may operate as a lifting arm, which can move the contact element 14 parallel to the movement of the actuation element 10.

Figure 5:
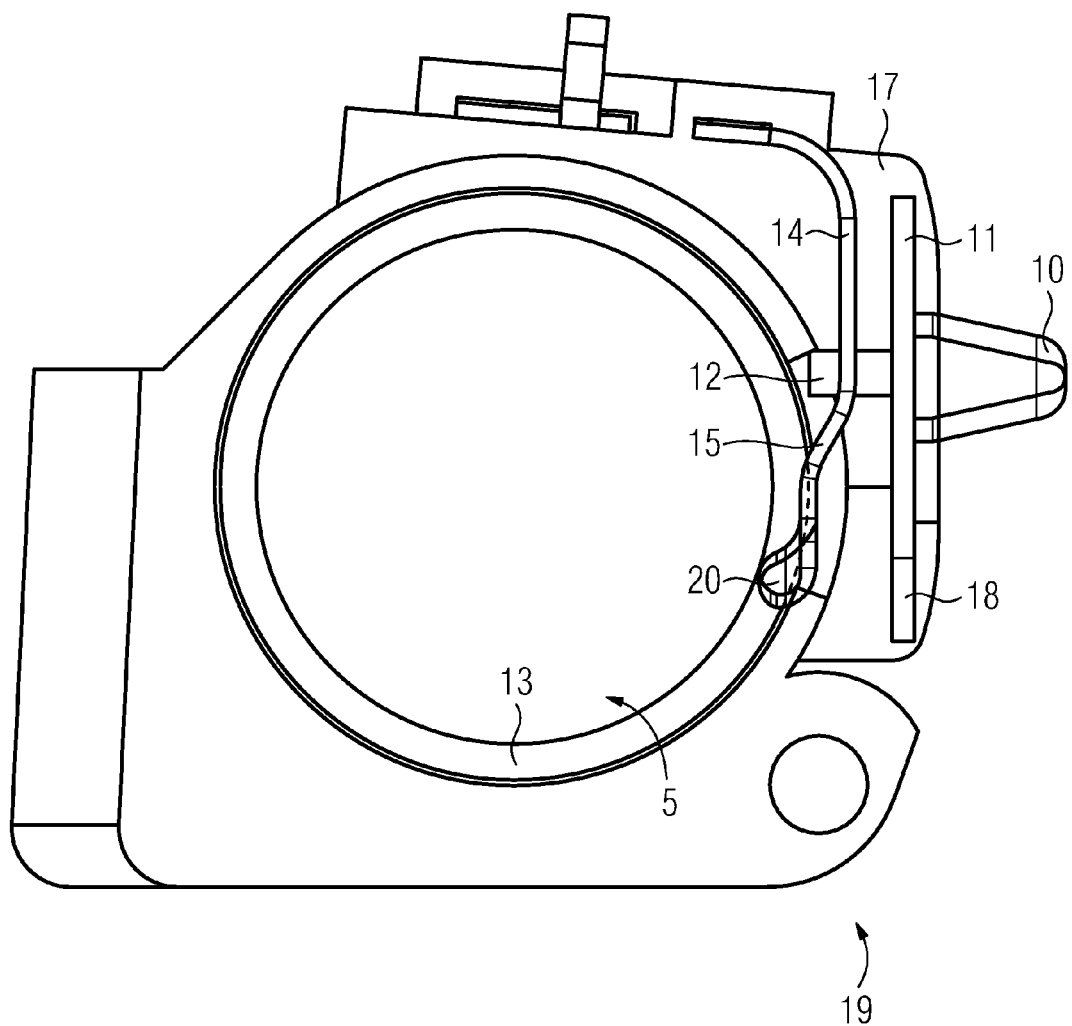
FIG. 5 is a side-elevational view of the battery compartment with the actuation element in the first position.
Figure 6:
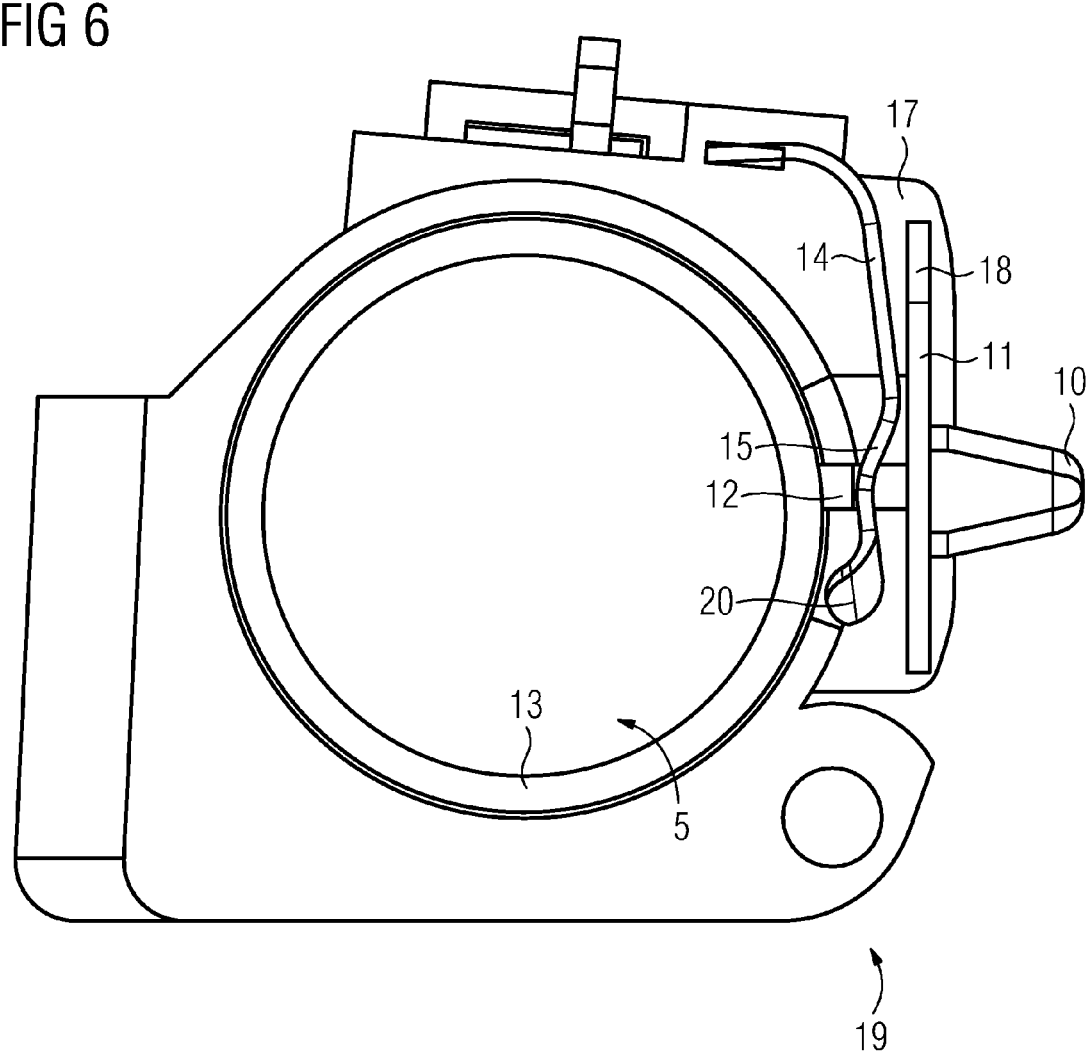
FIG. 6 is a side-elevational view of the battery compartment with the actuation element in the second position.

The first position of the actuation element 10 is diagrammatically reproduced on the basis of the structure of the battery compartment 19 shown in FIG. 5. It is even more apparent in this case that the electric potential at the tapping surface 13 of the battery 5 is tapped by the contact element 14 solely by way of the contact point 20. A displacement of the actuation element 10, as shown in FIG. 6, allows the contact element 14 to be lifted by the lifting element 12 on the contact surface 15 and thus the contact point 20 of the contact element 14 to be removed from the battery. It is possible to prevent the material from being scratched and to keep the contact point 20 contactable at all times because the contact point 20 of the contact element 14 is only able to contact the tapping surfaces 13 of the battery and no additional material.

The sliding plate 11 of the actuation element 10 reproduced in FIG. 7 has a detent nose 16, which in the first and second positions of the actuation element 10 protrudes into a recess in the frame or housing of the hearing device in each instance. A stability of the actuation element 10 is thus achieved and it is haptically indicated to the hearing device wearer that the actuation element 10 is located in the first and/or second position and the hearing device is switched on and/or off.

The invention claimed is:

1. A hearing apparatus, comprising:
   a battery compartment for accommodating a battery;
   a contact element having a contact point and a lifting section different from said contact point; and
   an actuation element disposed at said battery compartment and movable between first and second positions displaced linearly relative to each other for switching the hearing apparatus on and/or off;
   said actuation element, in said first position, causing said contact element to tap an electric potential on the battery with said contact point; and
   said actuation element, in said second position, lifting said contact element at said lifting section to lift said contact point from the battery.

2. The hearing apparatus according to claim 1, wherein:
   said lifting section of said contact element has a contact surface;
   said actuation element lifts said contact element at said contact surface; and
   a movement of said actuation element from said first to said second position effects a movement of said contact point substantially at right angles to said movement of said actuation element.

3. The hearing apparatus according to claim 1, which further comprises a lifting arm, said actuation element, in said second position, lifting said contact element from the battery with said lifting arm, and said lifting arm causing a movement of said actuation element from said first to said second position to effect a movement of said contact element substantially parallel to said movement of said actuation element.

4. The hearing apparatus according to claim 1, which further comprises a housing, said actuation element having a detent nose protruding, in at least one position of said actuation element, into an opening in said housing to stabilize said actuation element.

5. The hearing apparatus according to claim 1, which further comprises a frame, said actuation element having a detent nose protruding, in at least one position of said actuation element, into an opening in said frame to stabilize said actuation element.

* * * * *